Dec. 13, 1960     H. FRIEDMAN ET AL     2,964,632
COINCIDENCE-GLOW RADIATION DETECTOR
Filed April 7, 1955     2 Sheets-Sheet 1

INVENTORS
HERBERT FRIEDMAN
TALBOT A. CHUBB
JAMES E. KUPPERIAN, JR.
BY
ATTORNEY

INVENTORS
HERBERT FRIEDMAN
TALBOT A. CHUBB
JAMES E. KUPPERIAN, JR.

United States Patent Office 2,964,632
Patented Dec. 13, 1960

2,964,632

COINCIDENCE-GLOW RADIATION DETECTOR

Herbert Friedman, 2643 N. Upshur St., Arlington, Va.; Talbot A. Chubb, 207 Oneida Way, Forest Heights, Md.; and James E. Kupperian, Jr., 335 Irvington, Glass Manor, Md.

Filed Apr. 7, 1955, Ser. No. 499,798

17 Claims. (Cl. 250—83.6)

This invention relates generally to radiation detectors and more particularly to improved detectors of the Geiger counter type which are suitable for a wide variety of uses including distribution to the general public.

The use of radiation detectors has increased in recent years due to the growing interest in radioactive materials and other sources of nuclear radiation. While the availability of expensive precision detection instruments satisfies the demand of those engaged in large scale operations, such as prospecting for radioactive ores, a great many other applications of radioactive detectors have remained dormant due to the excessive costs involved.

With the possibility of thermonuclear attack now threatening vast areas of population it becomes a pressing problem of civil defense to provide to the general public a reliable low-cost instrument which will accurately indicate the quantity of radioactivity present relative to the levels which are safe or dangerous to human life.

Many forms of ionization tube radiation detecting instruments are known and are available for use in such applications as scientific measurements and prospecting for radioactive ores. Other devices are available which can be used as dosimeters to indicate the time integral of radiation received by the device. These known arrangements which are capable of indicating or measuring the presence of nuclear and X-radiation over a wide range of values and sensitivities have been generally satisfactory for particular applications. Where a continuously observable quantitative indication is desired, however, all heretofore known radiation detector instruments have been inherently complex and expensive especially in the power supply arrangements and the requirement for amplification of the detector current to obtain a suitable indication. In devices of this type which have attempted to minimize the detector current amplification required for a suitable indication, undesirable operating characteristics have been introduced.

In one form of instrument it has been proposed to provide a neon glow tube in series with a Geiger tube and a regulated direct current supply. With this arrangement it is necessary to provide a storage capacitor across the neon tube to integrate the current passed by the Geiger tube for many ionizing events before sufficient charge is built up to give a visible glow discharge indication in the neon tube. Thus moderate and low levels of radiation result in only an occasional flash of the neon tube and the resultant uncertainty as to the ambient radiation level is undesirable. Furthermore an expensive regulated direct current supply is required to maintain the calibration associated with the periodicity of the neon flash.

Other known detector tube circuits utilize a power supply having a pulsating voltage superimposed upon a direct voltage supply. Such proceedures are useful if it is desired to resort to amplification of the detector tube current since the detector current has an A.C. component corresponding to the pulsating supply. If the additional pulse voltage of the power supply is sufficiently large to operate the detector tube in the spark discharge region, a relatively large detection current can be obtained but only at very low repetition rates, since the spark discharge is self-sustaining. Operation of the detector tubes in the spark discharge region is generally injurious to the tube and results in altered characteristics and a shortened useful life.

Accordingly, it is the primary object of the present invention to provide improved simple, reliable detectors for radioactive and X-ray radiation and improved methods for detection.

Another object is to provide improved radiation detectors which have stabilized operating characteristics and produce detection currents many times greater than heretofore obtained without unduly shortening the useful life of the detector tube.

A further object is to provide a radiation detector which is capable of being manufactured on a mass production basis and used by any member of the general public to rapidly determine the level of ambient radioactivity.

In one form of the present invention a simple vibrator-transformer arrangement is used to generate a high voltage pulse of short duration and relatively high repetition rate. This voltage is applied to a Geiger-Muller type tube containing in addition to neon or other inert gas an electronegative quenching agent such as a halogen gas. In series with the detector tube is a current indicator which may be a simple neon glow tube. The detector tube produces, upon coincidence of an ionizing event and the applied voltage pulse, a heavy current discharge which is sufficient to flash the neon tube indicator.

These and other objects will be apparent from the following detailed specification taken with the accompanying drawings in which.

Figure 1:
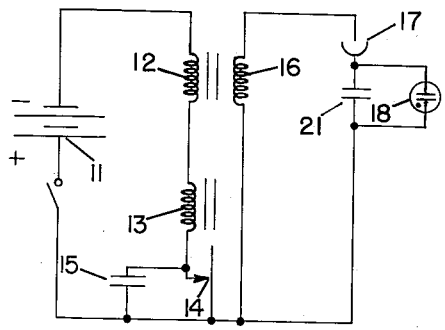
Fig. 1 is a schematic wiring diagram of one form of the invention.

Referring to Fig. 1, a flashlight dry cell 11 is connected in series with a transformer primary 12, an actuating coil 13 and a vibrating contact 14. The contact 14 is shunted by a capacitor 15. With this arrangement the vibrator contacts 14 open and close at the natural frequency of the electromechanical system and upon opening a high inductive voltage is induced in the primary winding 12. A secondary winding 16 having many more turns than the primary 12 provides a high voltage pulse for operation of the detector circuit. For this purpose the secondary 16 is connected serially with a Geiger-Muller tube 17 and a neon glow tube 18. The primary and secondary circuits may have a common bus from the positive terminal of the battery 11 as shown. As the voltage pulse from the secondary 16 is applied to the series combination of the Geiger tube 17 and the neon tube 18, capacitive voltage division will occur in accordance with the capacitance between the electrodes of the two tubes 17, 18. In order that this voltage distribution not exceed the breakdown potential of the neon tube 18, an additional capacitor 21 may be required of value sufficient to insure that substantially the entire voltage from the secondary 16 appears across the detector tube 17. In cases where the capacitance of the neon tube 18 is sufficiently large, the capacitor 21 is not necessary.

The circuit of Fig. 1 can be manufactured from readily available economical parts. For example, the battery 11 may be an ordinary flashlight cell while the vibrator 13, 14 can be a buzzer of the type commonly found in toys or other such low cost applications. If an indefinitely long shelf life is desired, a battery of the mercury cell type can be used. The transformer 12, 16 can be a small audio transformer having an impedance of 4 ohms for the winding 12 and 10,000 ohms for winding 16, for example. One Geiger counter 17 which has been used is a low cost commercial type designated Raytheon CK-1034 and has a cathode diameter somewhat less than one centimeter with a cathode-to-anode diameter ratio less than 20. This particular tube 17 is filled with a neon-chlorine mixture. The neon tube 18 is a type NE-2. Capacitor 15 is 0.01 mfd. and capacitor 21 is 50 mmf. With this particular circuit it has been found that a secondary voltage pulse of approximately 1,000 volts having a duration of about 100 microseconds and a repetition rate of several hundred pulses per second is obtained. For these conditions with positive voltage pulse applied to the anode wire, coincidence with an ionizing event in the Geiger tube 17 produces a flash in the neon tube 18 once every 5 to 10 seconds for very low energy levels such as produced by a radium paint watch dial, for example. As the radiation level increases the neon tube 18 flashes more frequently until at levels which are dangerous for continuous exposure the flashing rate is as rapid as can be readily counted by visual observation. For still higher intensities the flashing rate increases until it appears as a continuous glow. At this point further increase in the radiation level produces a more intense and larger area of glow in the neon tube 18. Thus with this simple circuit arrangement of Fig. 1, a readily interpreted indication is given as to whether an area is radioactive at a level which will produce fatal exposure in very short periods, or is dangerous upon an extended exposure or is safe for a reasonable or indefinite time. The latter condition corresponding to the flashing rate obtained from a radium watch dial or a similar sample of low level radioactive material which could be supplied as a test sample to assure the operator that the device is in proper working condition.

The value of a detector instrument as just described under conditions of radioactive fallout are obvious. By observing the flashing rate of the glow indicator, local positions of minimum radioactivity can be found. Precautionary measures can be taken and their effect observed immediately. Since the instrument can be made completely reliable at low cost, it can be sold to all members of the public and thus enable the population to resume activities without fear after an attack as soon as the radiation level drops to safe levels.

Figure 2:
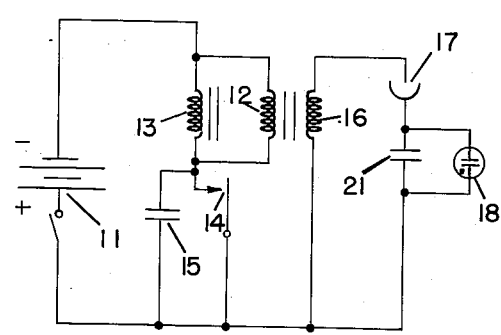
Fig. 2 is a modification of Fig. 1.

The circuit of Fig. 2 is similar in all respects to that of Fig. 1 except that the vibrator winding 13 is connected in parallel with the primary winding 12. With this arrangement it has been found desirable to use an impedance of 40 ohms for primary winding 12 and 100,000 ohms for the secondary 16.

Figure 3:
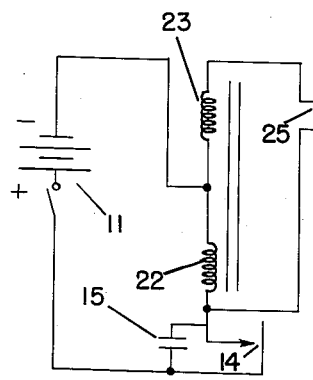
Fig. 3 is a wiring diagram of an arrangement using a self-indicating Geiger tube.

In Fig. 3 a modified vibrator is used in which an actuating winding 22 is wound on a common iron core with an auto-transformer step-up winding 23. This arrangement is capable of producing the required high voltage pulse without the use of a separate transformer, upon intermittent energization of the winding 22 by the action of the vibrating contact 24. The circuit is further simplified by the elimination of a separate indicator through the use of a self-indicating Geiger tube 25. This tube 25 is of the electronegative gas quenched type, as previously mentioned and has a cylindrical cathode 26 made of wire gauze or screen mesh material to permit visual observation of the flash discharge occurring within the tube 25. The combination of the auto-transformer vibrator 22, 23, 24 and the self-indicating detector tube 25 reduces to a minimum the component parts of the detector device. Either of these features can be used in the other disclosed circuits, however.

Figure 4:
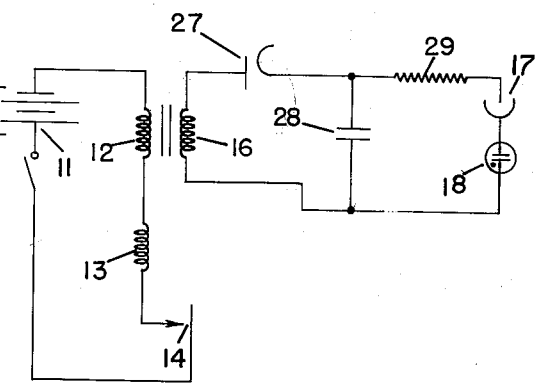
Fig. 4 is a wiring diagram of a detector circuit using a D.C. supply.

In Fig. 4 a vibrator power supply is utilized to obtain a high alternating voltage which is rectified by a cold cathode gas tube 27 to provide a direct potential supply across a filter capacitor 28. The magnitude of the direct potential across the capacitor 28 is in the region of multiple pulsing non-self sustained corona discharge as will be more fully explained. Across capacitor 28 are serially connected a resistor 29, a chlorine gas quenched Geiger tube 17 and a neon indicator 18. The resistor 29 is of large value, as high as 100 megohms, for example. Using a high resistance in this manner permits the Geiger tube 31 to be connected to a direct voltage much higher than the normal Geiger counter region with the result that higher detection current is obtaining than is possible if the tube is operated at a lower voltage in the single pulse normal Geiger region.

In the D.C. form of the coincident glow radiation detector, bright flashes from a neon indicator are produced from single ionizing events by using a halogen tube at abnormally high overvoltages made possible by maintaining an excessive time constant across the halogen counter. This form of operation is based on the discovery that the halogen tube will pass large pulses of current in the corona region without deterioration of the counting gas and will also recover within a usefully short time.

Figure 5:
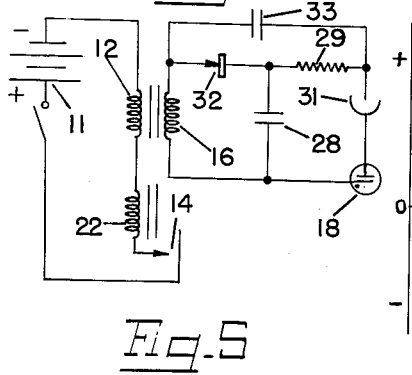
Fig. 5 is a modification using a pulsing supply potential.

In Fig. 5 a vibrator power supply is provided using a high voltage silicon junction diode 32 as the rectifier. In addition to the direct voltage applied to the Geiger tube 17 through the resistor 29 which may be, for example, 10 megohms, a capacitor 33 is coupled between the secondary 16 and the anode of tube 17. With this arrangement lower voltage pulses from the secondary 16 can be utilized since the peak value of the pulsating voltage applied to the tube 17 will be almost twice the pulse voltage at the secondary 16. With the junction diode 32 both the direct voltage across the counter and the peak pulse amplitude become relatively independent of the battery voltage due to the clipping action of the reverse conduction characteristic of the diode.

Figure 6:
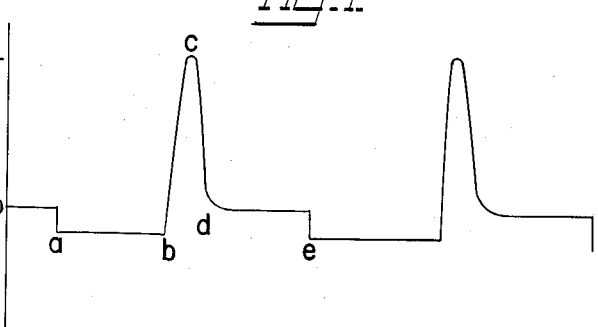
Fig. 6 is a voltage waveform diagram.

Fig. 6 is a voltage waveform suitable for application to the counter tube 17 in the pulse operated circuits of the invention. During the interval from $a$ to $b$ the contacts 14 are closed and the current drawn produces a small negative voltage across the tube 17. At point $b$ the contacts 14 open producing a high inductive voltage peak at $c$ which decays rapidly until time $d$. Between time $d$ and $e$ the contacts 14 remain open and the cycle is repeated beginning at time $e$. With this waveform the negative clearing field is applied to the Geiger tube immediately before the positive operating pulse occurs thus enhancing the deionization characteristics of the tube. The longer the clearing time, $a$–$b$, the more effective the operation will be.

Figure 7A:
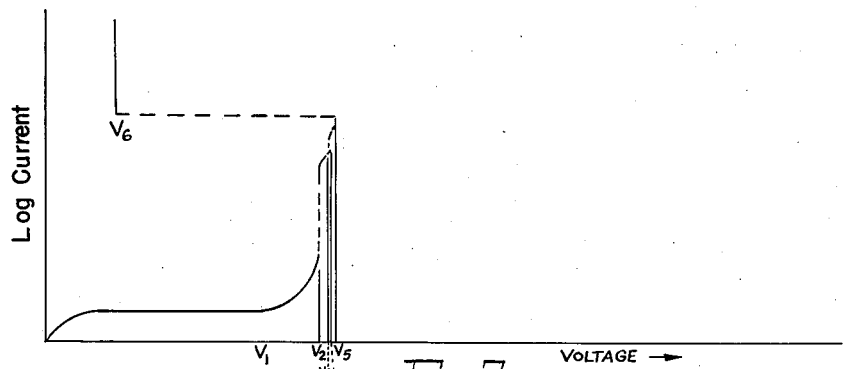
Figs. 7A, 7B and 7C show the discharge characteristics of various ionization tubes as a function of the applied voltage, 7A being a tube filled only with a simple inert gas, 7B a simple gas and a polyatomic quenching agent and 7C a rare gas and a halogen gas.
Figure 7B:
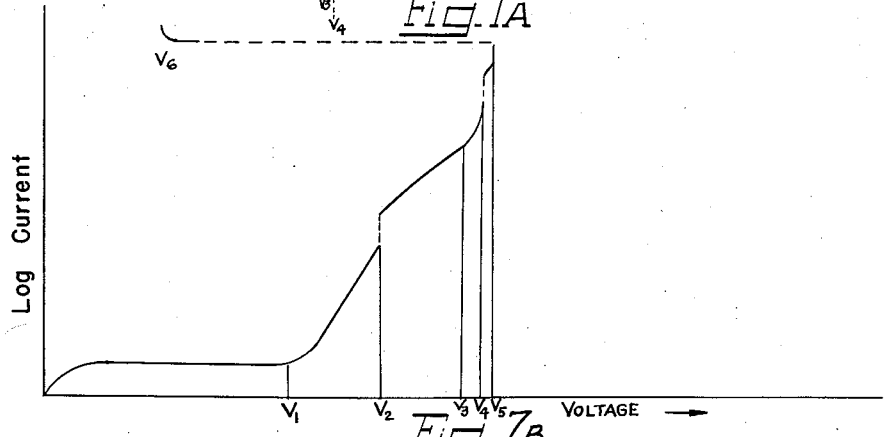
Figure 7C:
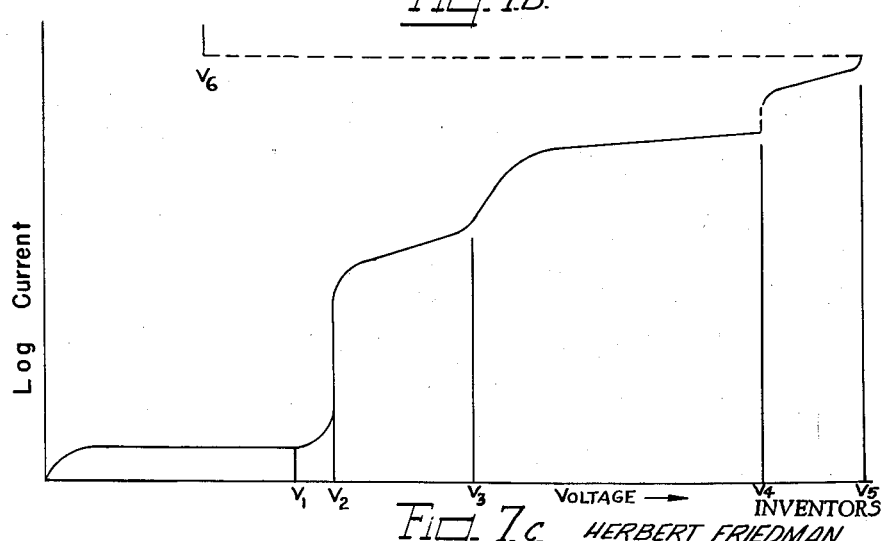

The operation of the detectors of the present invention can be better understood by reference to Figs. 7A, 7B and 7C. These curves show the D.C. current which is passed by three different Geiger counter tubes as a function of applied D.C. voltage when the tube is placed in a constant radiation field. At voltage below $V_1$ only the primary ions produced by the impinging radiation are collected on the electrodes. This is known as the region of ion chamber operation. In the region between $V_1$ and $V_2$, a primary electron gains enough energy in its travel towards the positive wire electrode to produce impact ionization in a collision with a neutral gas molecule. The voltage at which this process starts represents the beginning of the avalanche region of gas amplification. As the voltage is raised the process may begin at greater distances from the wire and the size of the avalanche grows very rapidly. At $V_2$ the current rises still more abruptly because the excitation of short wavelength ultraviolet releases photoelectrons in the gas and at the walls, and each new electron can trigger a new avalanche elsewhere in the tube. Instead of the discharge terminating in a single avalanche for each primary electron, each avalanche now breeds a series of new avalanches until the discharge has spread throughout the length of the tube. This type of corona discharge characterizes the beginning of the true Geiger counter region ($V_2$ to $V_3$). Each discharge once started, is terminated by the growth of space charge in the form of a sheath around the anode wire. The space charge quenching takes place in a time less than 10 microseconds. Following the collection of electrons in the wire, the space charge drifts toward the cathode where it is neutralized. At the instant of collision with the cathode, the space charge may reignite the discharge by releasing secondary electrons from the cathode. In a self-quenched Geiger tube this process is prevented by including a suitable quenching admixture in the gas filling. In the true Geiger region between $V_2$ and $V_3$, the quenching mechanism leads to sharp, clean pulses, one pulse for each ionizing event. Between $V_3$ and $V_4$ the quenching process becomes inadequate and multiple pulsing occurs. Instead of single pulses, each ionizing event triggers a chain of pulses which break off statistically. Near $V_3$ the trains of pulses will be short; the lengths of the trains will increase toward $V_4$. The region between $V_3$ and $V_4$ is still a region of nonself-sustaining corona. Between $V_4$ and $V_5$ is a transition region where an ionizing event initiates a self-sustained corona. Above $V_5$ an ionizing event will cause a spark discharge and the tube goes into a heavy current continuous discharge usually of the glow type.

In one form of operation of the detector of the present invention the counter is operated at a voltage below $V_2$, preferably with a slightly negative voltage on the wire, and a pulse is periodically applied to bring the counter into the region between $V_3$ and $V_4$ or even up to $V_5$. In another form of operation the counter is maintained continuously in the region between $V_3$ and $V_4$ with a high resistance in series with the anode. Such operation is practical only with the use of a counter tube in which is present a strongly electronegative gaseous admixture, preferably one of a halogen gas which tubes have characteristics as shown in Fig. 7C. In such tubes the multiple pulsing region of nonself-sustaining corona from $V_3$ and $V_4$ is of unusually large extent, and yields unusually high current pulses. In the conventional type of counter tube filled with a pure simple gas, Fig. 7A, or a combination of a simple gas and a polyatomic quenching agent, Fig. 7B, both the Geiger region and the multiple pulsing region are very short.

The detectors of the invention make use of the extended quenching action of the halogen type tube and avoids the necessity of destructive sparking. If voltages above $V_5$ were employed spark operation would result and any complex component of the counting gas is destroyed, sputtered and carbonaceous deposits are built up, and the electrodes become pitted by the intense sparking. With a simple inert gas tube of the Fig. 7A type, operation is limited to the use of low recurrence pulse rates due to the persistence of metastable atoms in the gas following each discharge. If the halogen type of tube of Fig. 7C were operated in the spark discharge region, the intense ionization accompanying the hot sparks will cause spurious breakdowns at high pulse rates.

For a tube containing only a rare gas, Fig. 7A, the region $V_1$ to $V_2$ may be only a few volts wide and $V_2$ to $V_5$ even narrower. In a conventional counter filled with alcohol and argon, Fig. 7B, the region $V_1$ to $V_2$ may be 200 volts wide, $V_2$ to $V_3$ from 100–200 volts wide, $V_3$ to $V_4$, 10–50 volts, $V_4$ to $V_5$ perhaps 10 volts. In contrast, the halogen counter, Fig. 7C will have a negligibly small region of $V_1$ to $V_2$, 200 or 300 volts from $V_2$ to $V_3$ as much as 2000 volts from $V_3$ to $V_4$ and several hundred volts from $V_4$ to $V_5$. The useful range of $V_3$ to $V_5$, as taught by the present invention, is therefore orders of magnitude greater than in argon filled tubes and polyatomic quenched types. Accordingly, a wide latitude in tolerance of components and battery voltage can exist without unduly altering the indications obtained with the present instruments.

Many applications of the detectors of the present invention will be apparent in view of the above teaching. As previously mentioned the instruments are relatively immune to variation in the values of circuit parameters. The large detection currents obtained from each ionizing event permit the use of a wide variety of indicating and utilization devices. As a further element of flexibility any of the disclosed pulse operated circuits can have their indications extended by approximately a factor of ten by merely reversing the polarity of the battery. Other well known indicators such as count rate meters, for example, can be used in the disclosed circuits as will be obvious to those skilled in the art. Accordingly the invention is to be limited only by the appended claims.

We claim:

1. A radiation detector comprising a battery, an electromechanical vibrator connected to said battery for periodically interrupting current flow, inductive means responsive to change in said current for producing a high voltage pulse, an electronegative gas quenched Geiger-Muller tube, a gas glow tube, and serial connections joining said glow tube, said Geiger-Muller tube and said high voltage pulse producing means for applying substantially all of said voltage pulse across said Geiger-Muller tube.

2. The combination of claim 1 and in addition a capacitor connected directly across said glow tube of magnitude sufficient to reduce the capacitive voltage division of said pulse across said glow tube below the glow discharge level of said glow tube.

3. The combination according to claim 1 in which said high voltage pulse applied to said Geiger-Muller tube is of magnitude greater than the true Geiger counter level and less than the spark discharge level for said Geiger-Muller tube.

4. A radiation detector comprising a battery, an electromechanical vibrator having a vibrating contact, a set-up transformer, a series circuit comprising said battery, said contact, the primary of said transformer and said vibrator, and a second series circuit comprising a halogen quenched Geiger-Muller tube, a gas glow tube and the secondary of said transformer for applying the alternating voltage of said secondary to said tubes.

5. The detector according to claim 4 in which the secondary of said transformer produces voltage pulses of magnitude to operate said Geiger-Muller tube in the multiple pulse region.

6. A radiation detector comprising a battery, an electromechanical vibrator having an actuating winding, a vibrating contact and a step-up winding coupled to said actuating winding, a circuit comprising said battery, said contact and said actuating winding, and a series circuit comprising an electronegative gas quenched Geiger-Muller tube, a gas glow tube and said step-up winding for applying the alternating voltage of said step-up winding to said tubes.

7. A radiation detector comprising a generator of voltage pulses of predetermined magnitude and waveform, an ionization tube having a transparent window making the discharge volume visible and containing an admixture of a rare gas and an electronegative quenching gas, and means for applying said pulses to said tube, said pulses being of magnitude greater than the true Geiger counter level and less than the spark discharge level for said tube.

8. A radiation detector comprising a battery, an electromechanical vibrator connected to said battery for periodically interrupting current flow, inductive means responsive to change in said current for producing a high voltage pulse, an ionization tube having a metal gauze cylindrical cathode and containing an admixture of a rare gas and an electronegative quenching gas, and connections joining said tube to said high voltage pulse producing means for applying said pulses across the tube.

9. A radiation detector comprising a high voltage D.C. supply, an ionization tube containing an admixture of a rare gas and an electronegative quenching gas, means for indicating ionizing events in said tube and connections between said tube and said D.C. supply including resistance at least as large as several megohms, the magnitude of said high voltage being greater than the true Geiger counter level and less than the spark discharge level for said tube.

10. A detector according to claim 9 in which said means for indicating ionizing events in said tube is a glass glow tube connected serially with said ionization tube.

11. A radiation detector comprising a battery, an electromechanical vibrator connected to said battery for periodically interrupting current flow, inductive means responsive to change in said current for producing a high voltage pulse, a rectifier circuit for producing a direct voltage from said pulse voltage, an electronegative gas quenched Geiger-Muller tube, means for indicating ionizing events in said tube, connections between said tube and said direct voltage including resistance at least as large as several megohms and a capacitor coupling said high voltage pulse to said tube with the same polarity as said direct voltage.

12. A radiation detector comprising a battery, an electromechanical vibrator connected to said battery for periodically interrupting current flow, inductive means responsive to the flow of said current for producing a low voltage pulse of negative polarity and relatively long duration followed by a short high positive voltage pulse resulting from the interruption of said current, an electronegative gas quenched Geiger-Muller tube, a gas glow tube, and serial connection joining said glow tube, said Geiger-Muller tube and said voltage pulse producing means for applying a substantial portion of said voltage pulses across said Geiger-Muller tube.

13. A radiation detector comprising a battery, a pair of contacts, means for periodically opening and closing said contacts, inductive means having input and output terminals and arranged for voltage step-up at said output terminals, circuit means connecting said input terminals, said contacts and said battery to produce at said output terminals a low voltage pulse of one polarity when said contacts are closed followed by a high voltage pulse of opposite polarity as said contacts open, a Geiger-Muller tube, a gas glow tube, and serial connections joining said glow tube and said Geiger-Muller tube to said output terminals for applying a substantial portion of said voltage pulses across said Geiger-Muller tube.

14. The combination of claim 13 having such respective capacitance values across said Geiger-Muller tube and said gas glow tube that the capacitive voltage division of said high voltage pulse across said gas glow tube is below the glow discharge voltage for said glow tube.

15. The combination of claim 14 in which said capacitance valves include a capacitor of predetermined magnitude directly connected across said gas glow tube.

16. A visible indicating radiation detector comprising a portable generator of periodic high voltage pulses, a Geiger-Muller tube, a gas glow tube for visual indication, circuit connections joining said Geiger-Muller tube and said gas glow tube serially and applying said high voltage pulses from said generator across said tubes in series, and a capacitor connected directly across said gas glow tube of sufficient capacity to prevent ionization of said gas glow tube by said voltage pulse in the absence of an ionizing event in said Geiger-Muller tube.

17. A radiation detector comprising a generator of voltage pulses of predetermined magnitude and waveform characterized by a portion of relatively small magnitude having one polarity followed by a short portion having opposite polarity and much greater magnitude, an ionization detector tube containing an admixture of a rare gas and an electronegative quenching gas, a current responsive indicator, and means for applying said pulses to said tube and indicating ionization current in said tube with said indicator, the magnitude of said greater magnitude pulses across said ionization detector tube being greater than the true Geiger counter level and less than the spark discharge level for said ionization tube.

References Cited in the file of this patent

UNITED STATES PATENTS

| | | |
|---|---|---|
| 2,612,615 | Fehr et al. | Sept. 30, 1952 |
| 2,617,955 | Mandeville et al. | Nov. 11, 1952 |
| 2,620,446 | Le Vine et al. | Dec. 2, 1952 |
| 2,675,484 | Hepp | Apr. 13, 1954 |